(12) United States Patent
Lee

(10) Patent No.: US 7,699,532 B2
(45) Date of Patent: Apr. 20, 2010

(54) BOTTOM BRACKET ASSEMBLY FOR BICYCLES

(76) Inventor: Chien Hao Lee, 1F, No. 39, Li Ming Tung Street, Taichung City (TW)

( * ) Notice: Subject to any disclaimer, the term of this patent is extended or adjusted under 35 U.S.C. 154(b) by 374 days.

(21) Appl. No.: 11/514,389

(22) Filed: Sep. 1, 2006

(65) Prior Publication Data
US 2008/0054140 A1      Mar. 6, 2008

(51) Int. Cl.
*F16C 13/00* (2006.01)
(52) U.S. Cl. ................................ 384/545; 74/594.1
(58) Field of Classification Search ............ 248/580, 248/602, 158, 161, 416, 157; 280/274, 281, 280/1, 259; 384/545; 74/594.1
See application file for complete search history.

(56) References Cited

U.S. PATENT DOCUMENTS 5,549,396 A * 8/1996 Chiang ..................... 384/545
5,980,116 A * 11/1999 Chiang ..................... 384/545
6,244,750 B1 * 6/2001 Chiang ..................... 384/545
7,234,373 B2 * 6/2007 Yamanaka ................. 74/594.1

FOREIGN PATENT DOCUMENTS

JP          2006101704 A  *  4/2006

* cited by examiner

*Primary Examiner*—A. Joseph Wujciak, III
(74) *Attorney, Agent, or Firm*—Rosenberg, Klein & Lee

(57) ABSTRACT

A bottom bracket assembly for supporting the crank axle of a bicycle includes a bottom bracket and two bases are securely connected to two open ends of the bottom bracket. Each base has a bearing received in a recess defined in an end thereof. Two collars each have a neck which is inserted and engaged with a central hole of the bearing corresponding thereto and each neck has a tapered inner periphery. An axle extends through the two bearings and the two collars. Two positioning rings are positioned between the axle and the tapered inner periphery of the collar. Each positioning ring has a tapered outer periphery which is matched with the tapered inner periphery of the collar corresponding thereto.

10 Claims, 10 Drawing Sheets

BOTTOM BRACKET ASSEMBLY FOR BICYCLES

FIELD OF THE INVENTION

The present invention relates to a bottom bracket assembly for supporting the crank axle of a bicycle. The assembly includes a simplified structure and is easily assembled.

BACKGROUND OF THE INVENTION

A conventional bicycle bottom bracket assembly 80 is shown in FIGS. 10 and 11, and generally includes a bottom bracket 81 with two bearing units 83 connected to two ends thereof and an axle 82 extends through the bottom bracket 81 and is cooperated with the two bearing units 83. Each of the two bearing units 83 includes a bowl 832, a plurality of beads 831 received in the bowl 832 and a locking member 84 which connected to the bowl 832 and guides the movement path of the beads 831. The bowl 832 is engaged with each of two open ends of the bottom bracket 81 and the locking member 84 is threadedly mounted to the axle 82 and connected to the bowl 832 correspondingly thereto. Two locking disks are then threadedly mounted to each one of two ends of the axle 82 to position the locking members 84. The accuracy of manufacturing of the parts and the assembling of the bottom bracket assembly decide the rotation of the axle 92 so that, in stead of the manufacturing processes of the parts, the quality of the assembling is crucial for the bottom bracket assembly. The requirements of assembling steps often consume a lot of time when assembling the conventional bottom bracket assembly.

The present invention intends to provide a bicycle bottom bracket assembly which is easily to be assembled and the precision of the assembling can be ensured by special design of the present invention.

SUMMARY OF THE INVENTION

The present invention relates to a bottom bracket assembly for supporting the crank axle of a bicycle which comprises a bottom bracket and two bases are securely connected to two open ends of the bottom bracket. Each base has a recess so as to receive a bearing therein. Two collars each have a neck which is inserted into and engaged with a central hole of the bearing corresponding thereto. Each neck has a tapered inner periphery.

An axle extends through the two bearings and the two collars. Two positioning rings are mounted to the axle and each located between the axle and the tapered inner periphery of the collar. Each positioning ring has a tapered outer periphery which is matched with the tapered inner periphery of the collar corresponding thereto.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
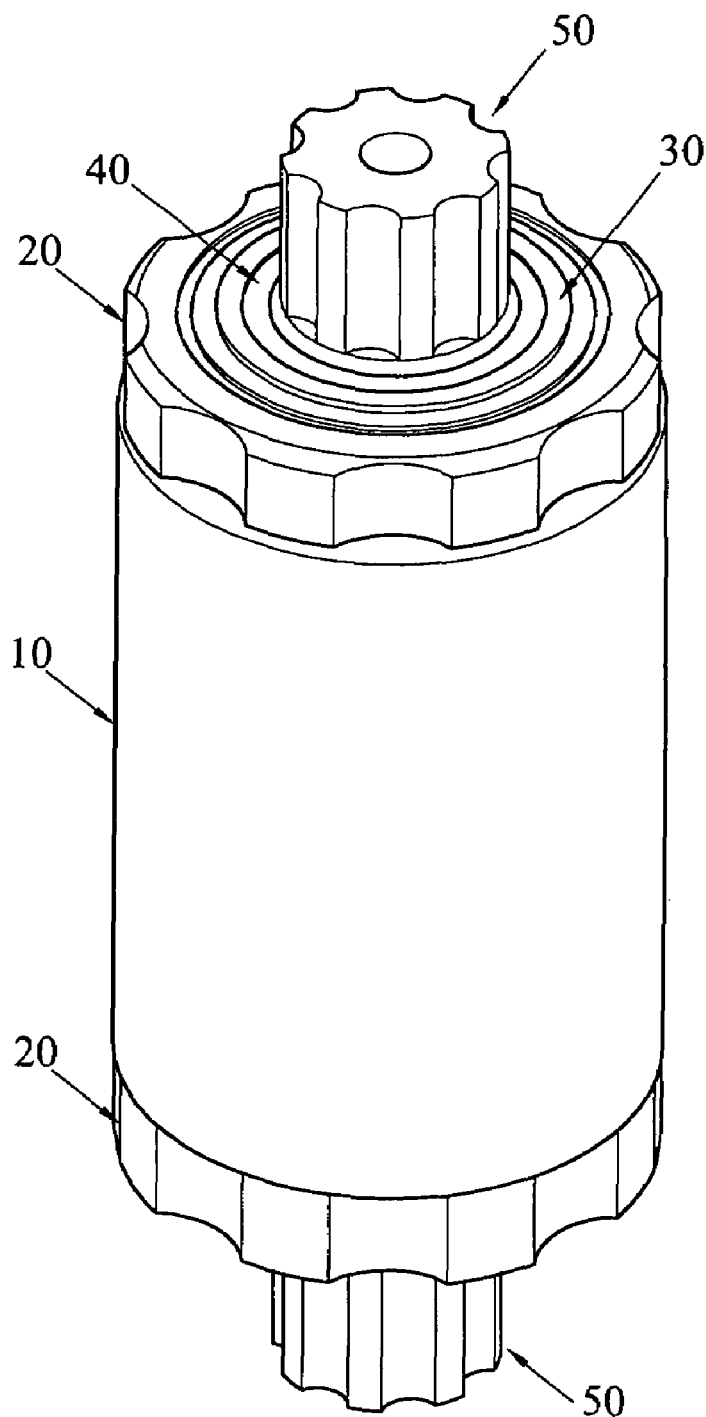
FIG. 1 is a perspective view to show the bottom bracket assembly of the present invention.
Figure 2:
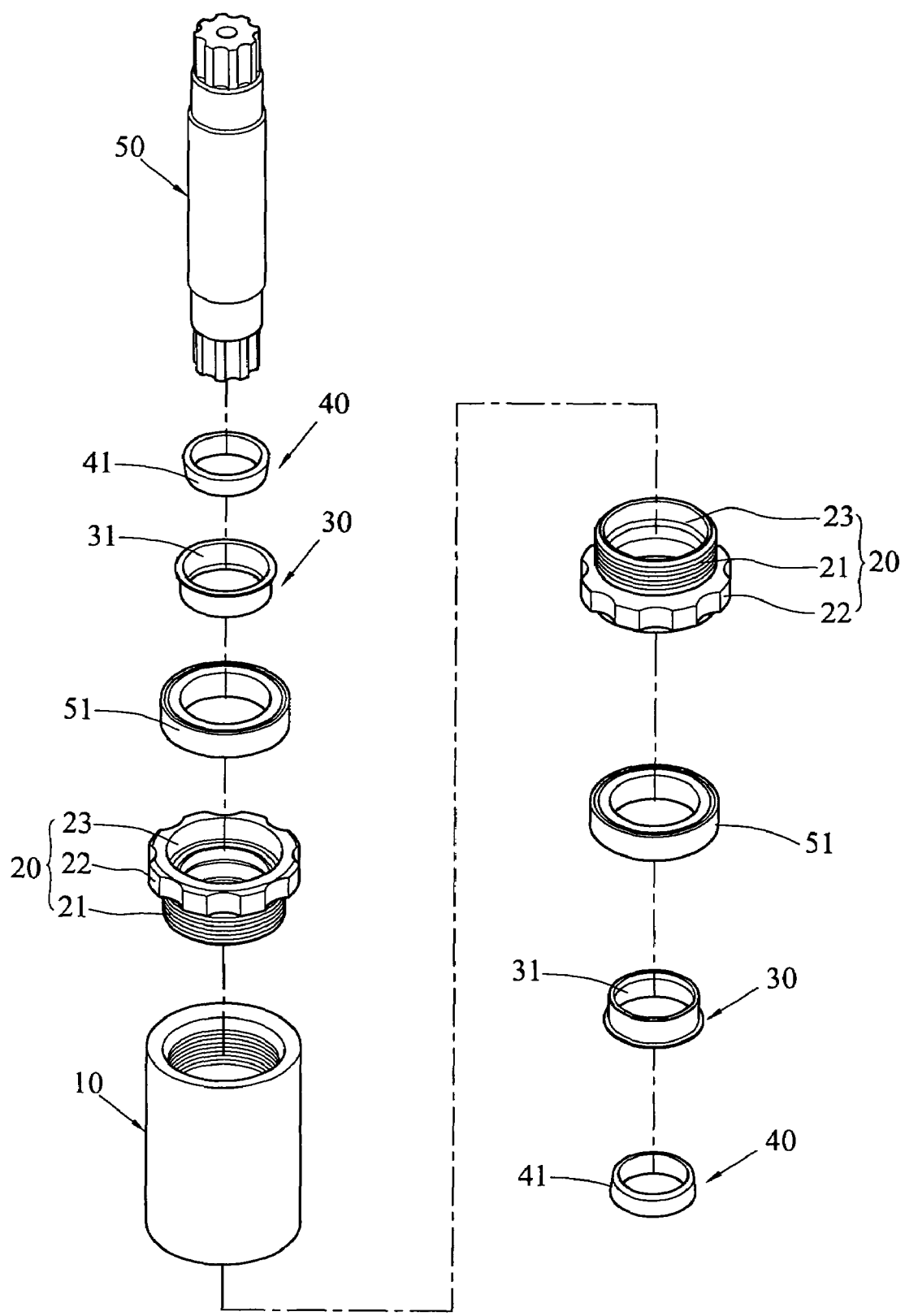
FIG. 2 is an exploded view to show the bottom bracket assembly of the present invention.
Figure 3:
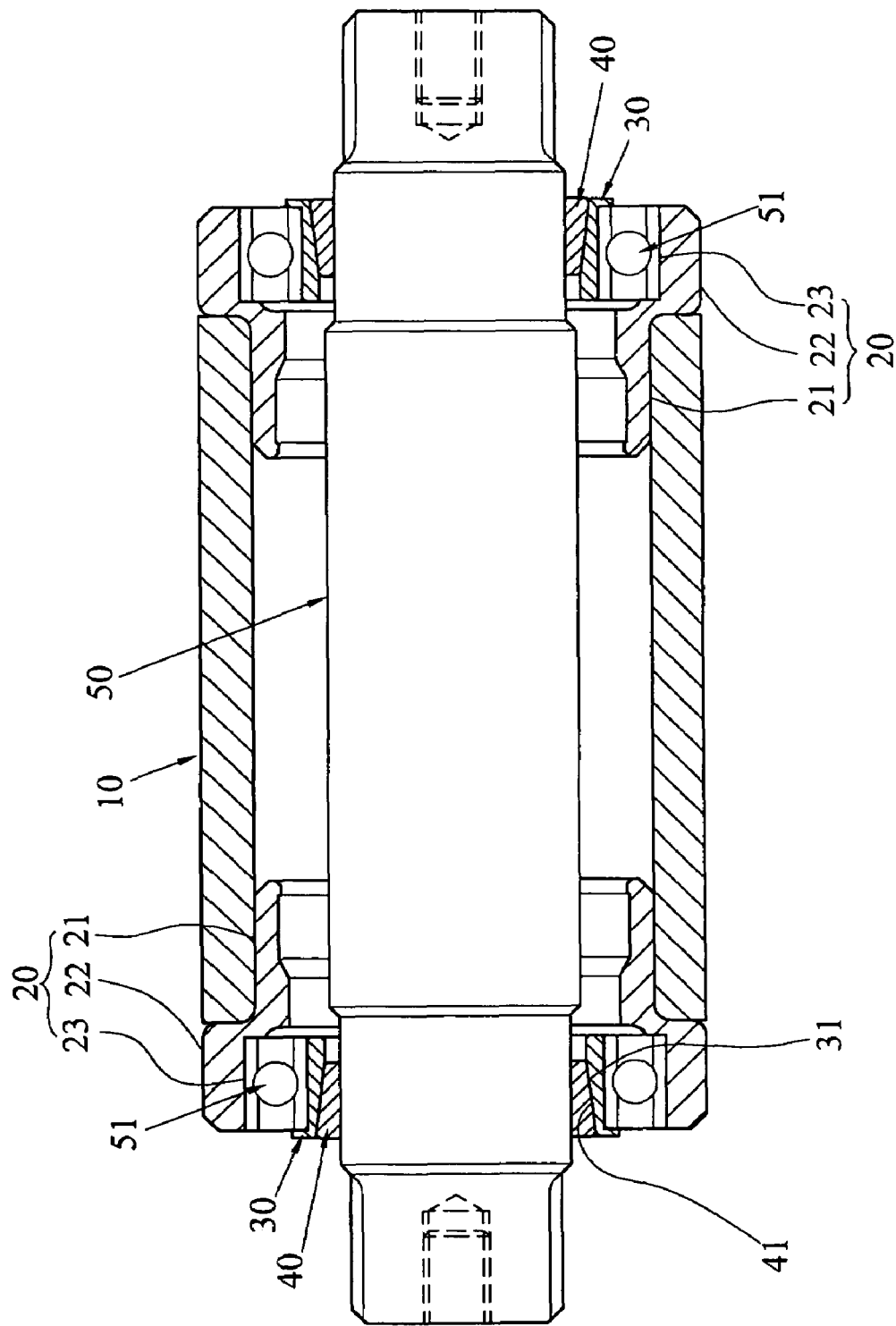
FIG. 3 is a cross sectional view of the bottom bracket assembly of the present invention.

Referring to FIGS. 1 to 3, the bottom bracket assembly for supporting the crank axle of a bicycle of the present invention comprises a bottom bracket 10 which has two open ends and each of the two open ends of the bottom bracket 10 has a threaded inner periphery. Two bases 20 each have a threaded insertion 21 which is threadedly connected with the threaded inner periphery of the bottom bracket 10 and a flange 22 extends radially from an end thereof. An outer diameter of the flange 22 is the same as an outer diameter of the bottom bracket 10, and the flanges 22 extend beyond the two ends of the bottom brackets 10. A recess 23 is defined in a center of the flange 22 so as to receive one of two respective two bearings 51 therein.

Two collars 31 each have a neck which is inserted into and engaged with a central hole of the bearing 51 corresponding thereto and each neck has a tapered inner periphery 31. An axle 50 extends through the two bearings 51 and the two collars 31. Two positioning rings 40 are mounted to the axle 50 and each are located between the axle 50 and the tapered inner periphery 31 of the collar 31. Each positioning ring 40 has a tapered outer periphery 41 which is matched with the tapered inner periphery 31 of the collar 31 corresponding thereto. The axle 50 is snugly engaged with an inner periphery of each of the positioning rings 40. The two positioning rings 40 are made by plastic so that it has proper flexibility. By the tapered inner periphery 31 of the collar 31 and the tapered outer periphery 41 of the positioning ring 40, the assembler can easily and precisely assemble the parts of the bottom bracket assembly of the present invention.

Figure 4:
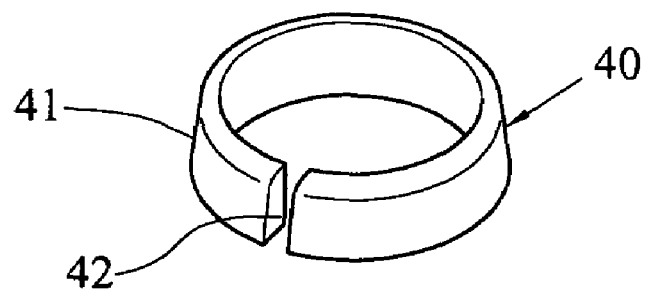
FIG. 4 shows an embodiment of the positioning ring.
Figure 5:
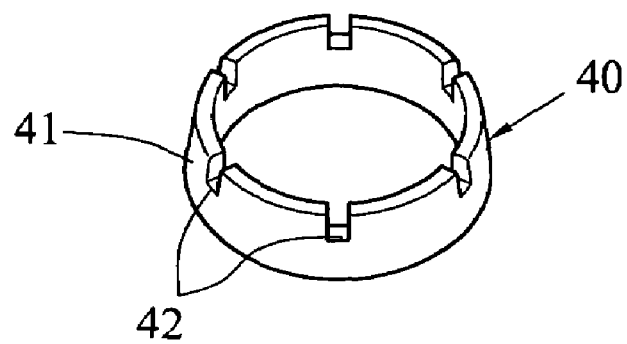
FIG. 5 shows another embodiment of the positioning ring.

Referring to FIGS. 4 and 5, the two positioning rings 40 each may have a longitudinal cut-off 42 so that the two positioning rings 40 each are a C-shaped ring, or the two positioning rings 40 each may have a small end and a wide end, a plurality of notches 42 are defined longitudinally in the small end. The two embodiments of the positioning ring 40 provide desired flexibility.

Figure 6:
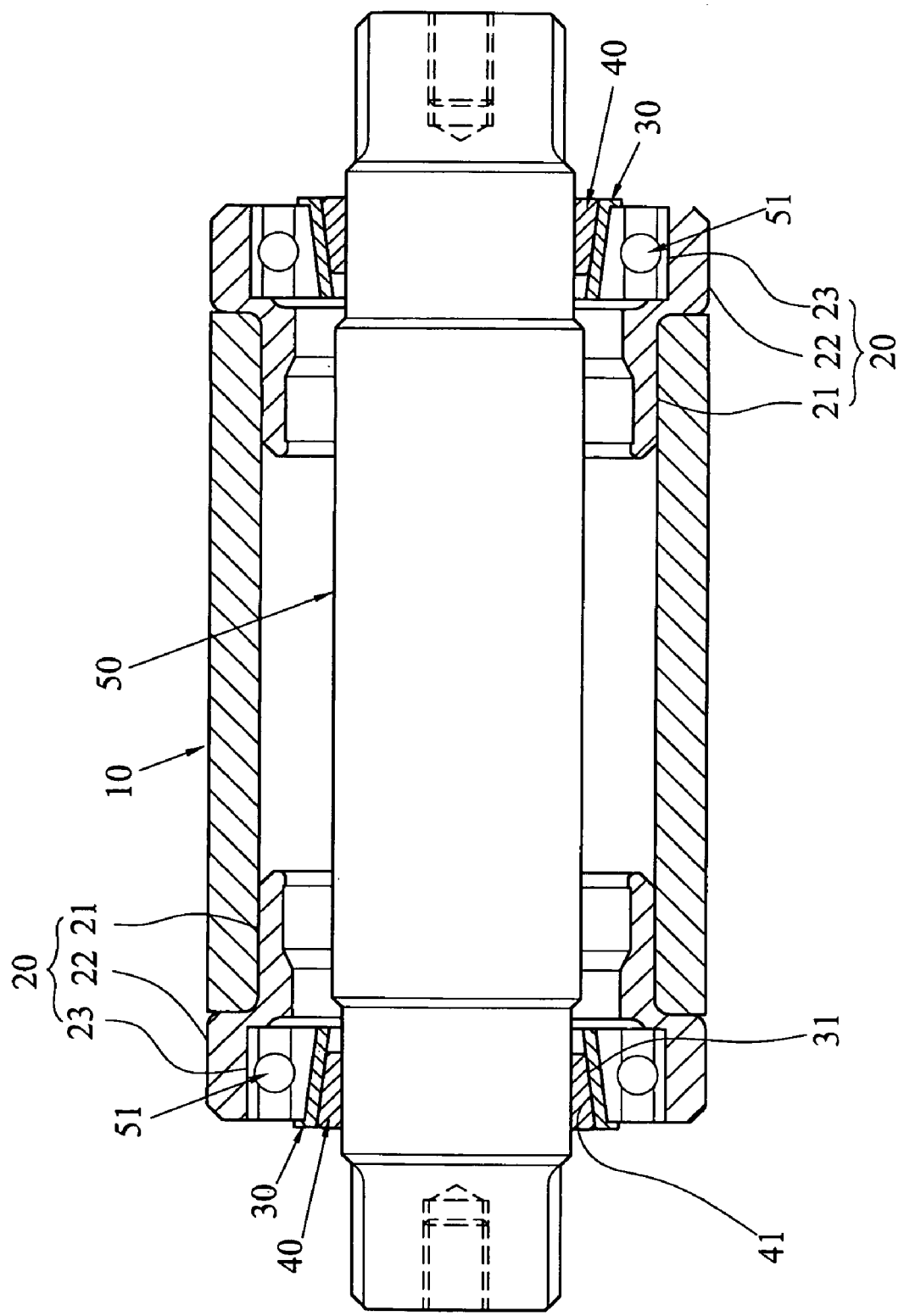
FIG. 6 is a cross sectional view of another embodiment of the bottom bracket assembly of the present invention.

FIG. 6 shows another embodiment of the bottom bracket assembly of the present invention, wherein the central hole of each bearing 51 may have a tapered inner periphery and the neck of each collar 31 has a tapered outer periphery which is engaged with the tapered inner periphery of the bearing 51.

Figure 7:
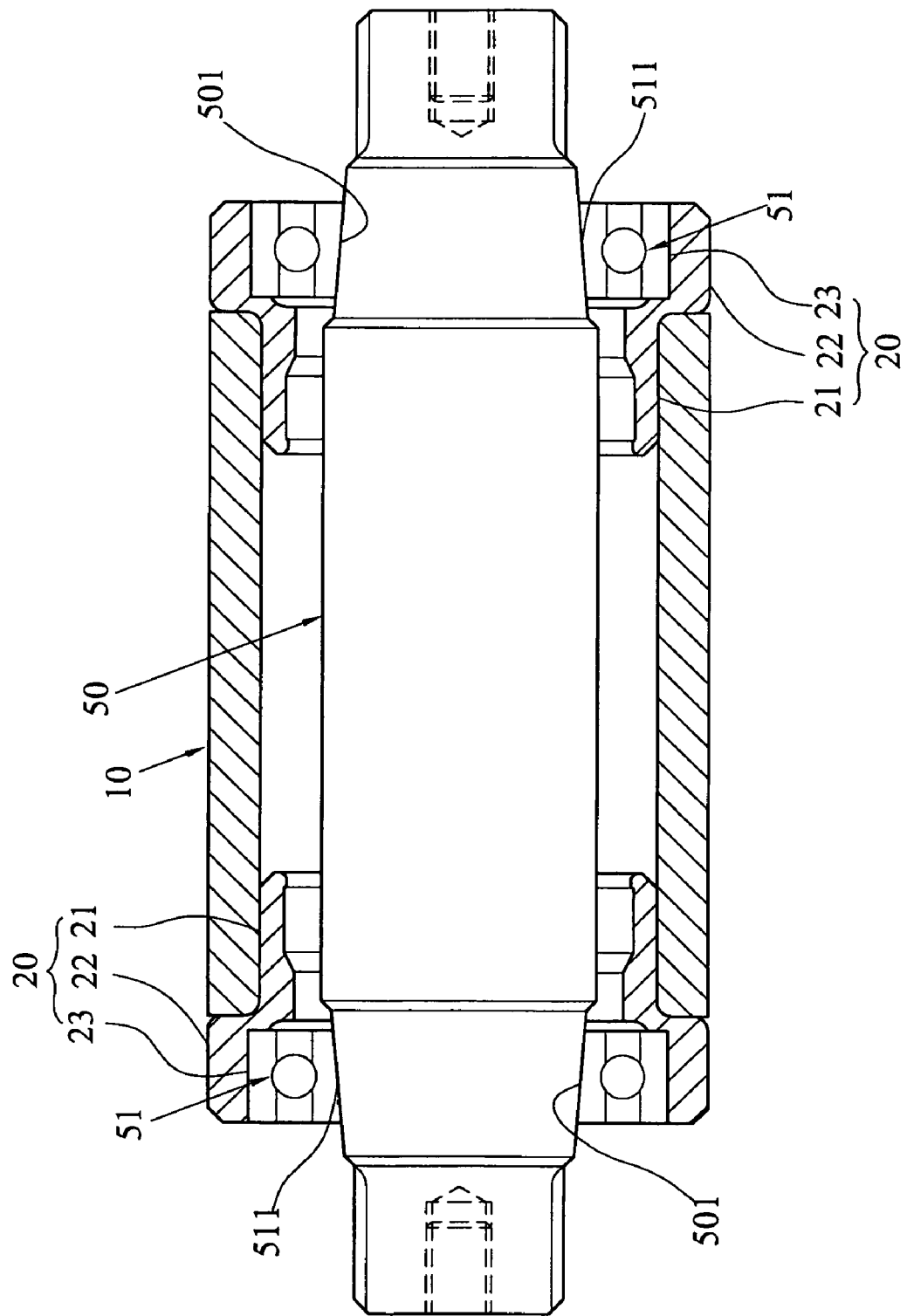
FIG. 7 is a cross sectional view of yet another embodiment of the bottom bracket assembly of the present invention.

FIG. 7 shows yet another embodiment of the bottom bracket assembly of the present invention, and comprises a bottom bracket 10 with two bases 20 threadedly connected to two open ends of the bottom bracket 10. Each base 20 has a recess 23 defined in an end thereof so as to receive a bearing 51 therein. The bottom bracket 10 and the bases 20 are the same as the previous embodiments. Each bearing 51 includes a central hole which has a tapered inner periphery 511. An axle 50 extends through the two bearings 51 and includes two tapered sections 501 which are respectively engaged with the two respective tapered inner peripheries 511 of the two bearings 51. This embodiment involves less number of parts.

Figure 8:
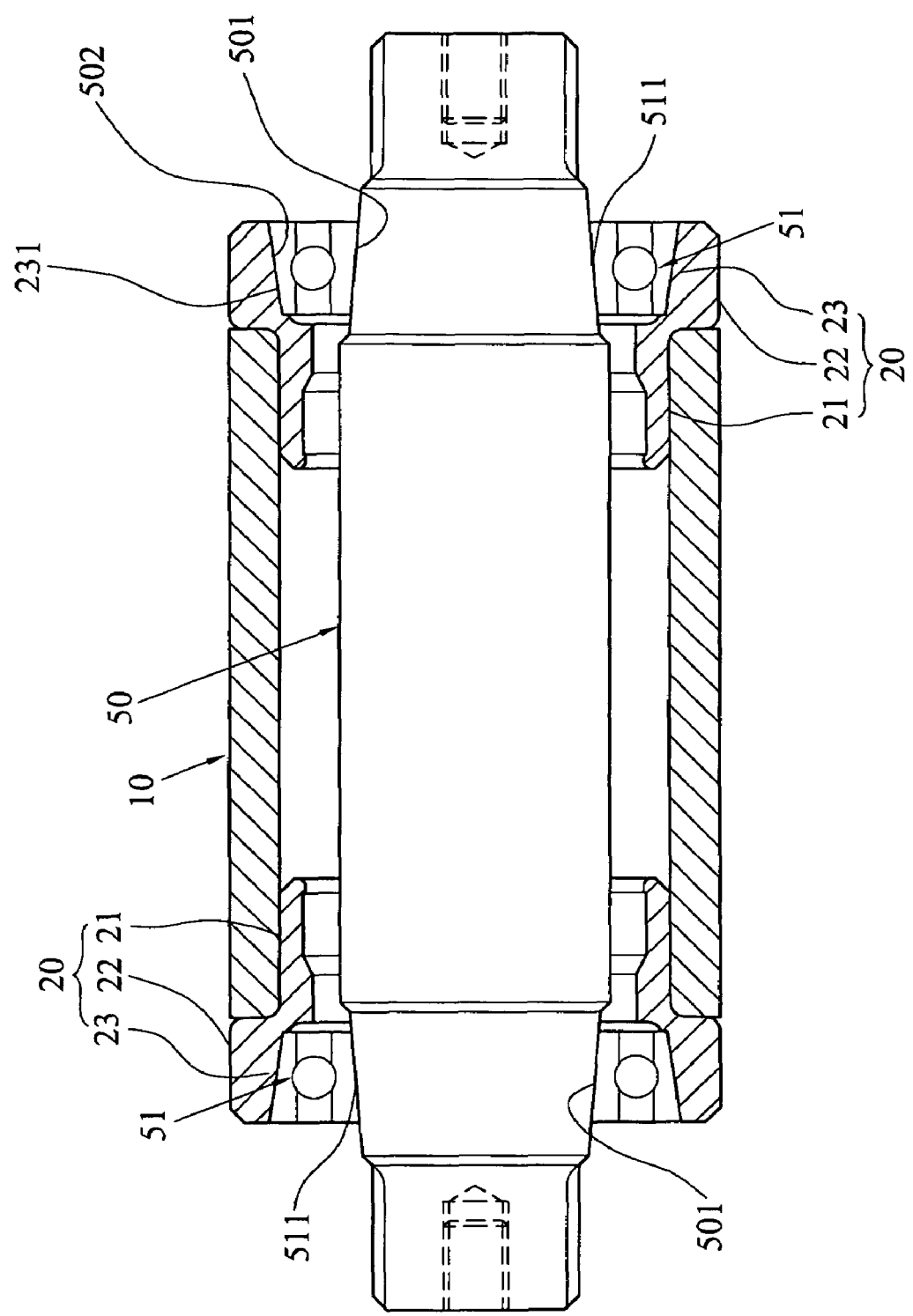
FIG. 8 shows a further embodiment of the bottom bracket assembly of the present invention.

FIG. 8 shows a further embodiment of the bottom bracket assembly of the present invention wherein the recess 23 includes a tapered inner periphery 231 which is matched with tapered outer periphery 502 of the bearing 51.

Figure 9:
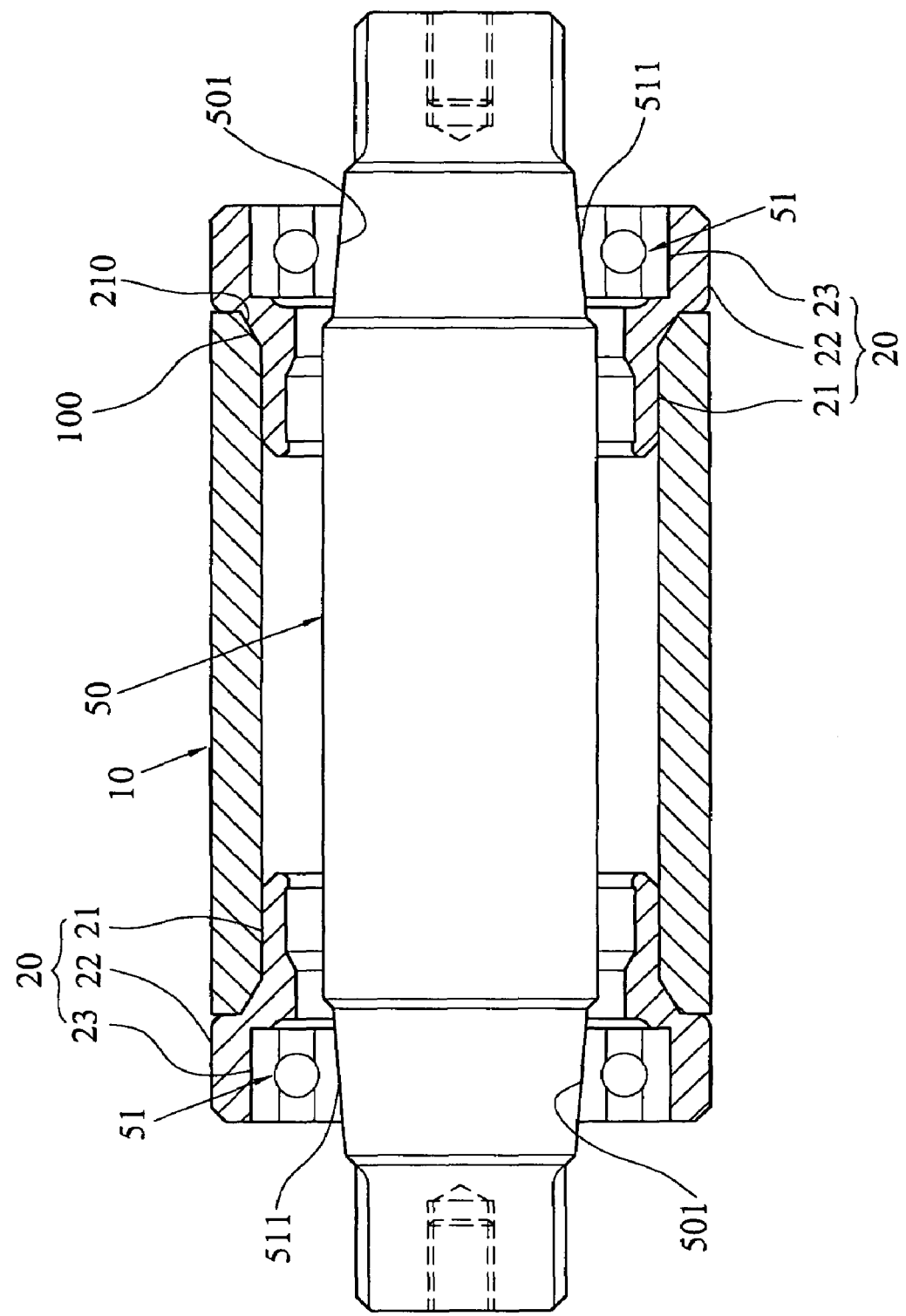
FIG. 9 shows another embodiment of the bottom bracket assembly of the present invention.
Figure 10:
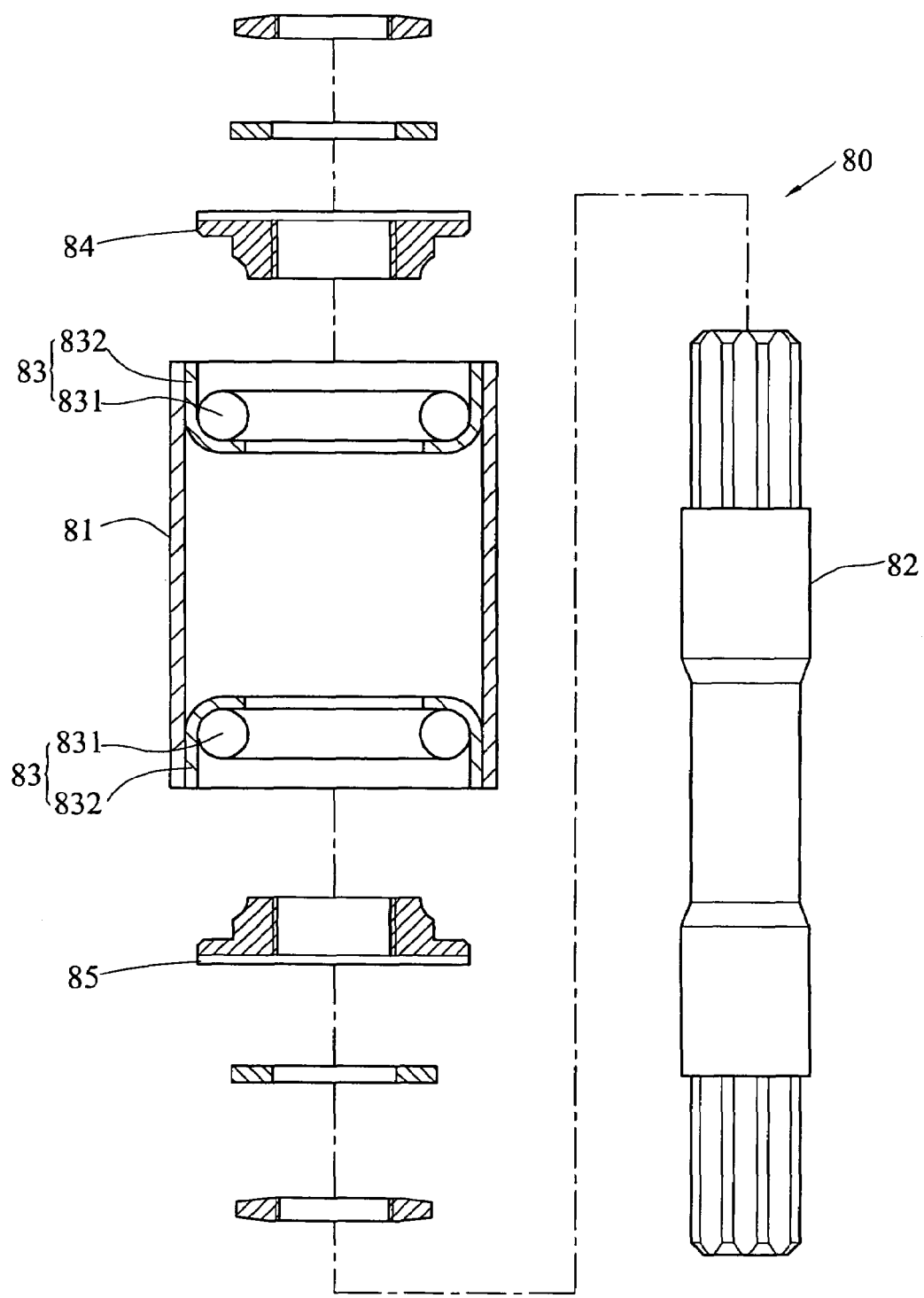
FIG. 10 is an exploded view to show a conventional bottom bracket assembly.
Figure 11:
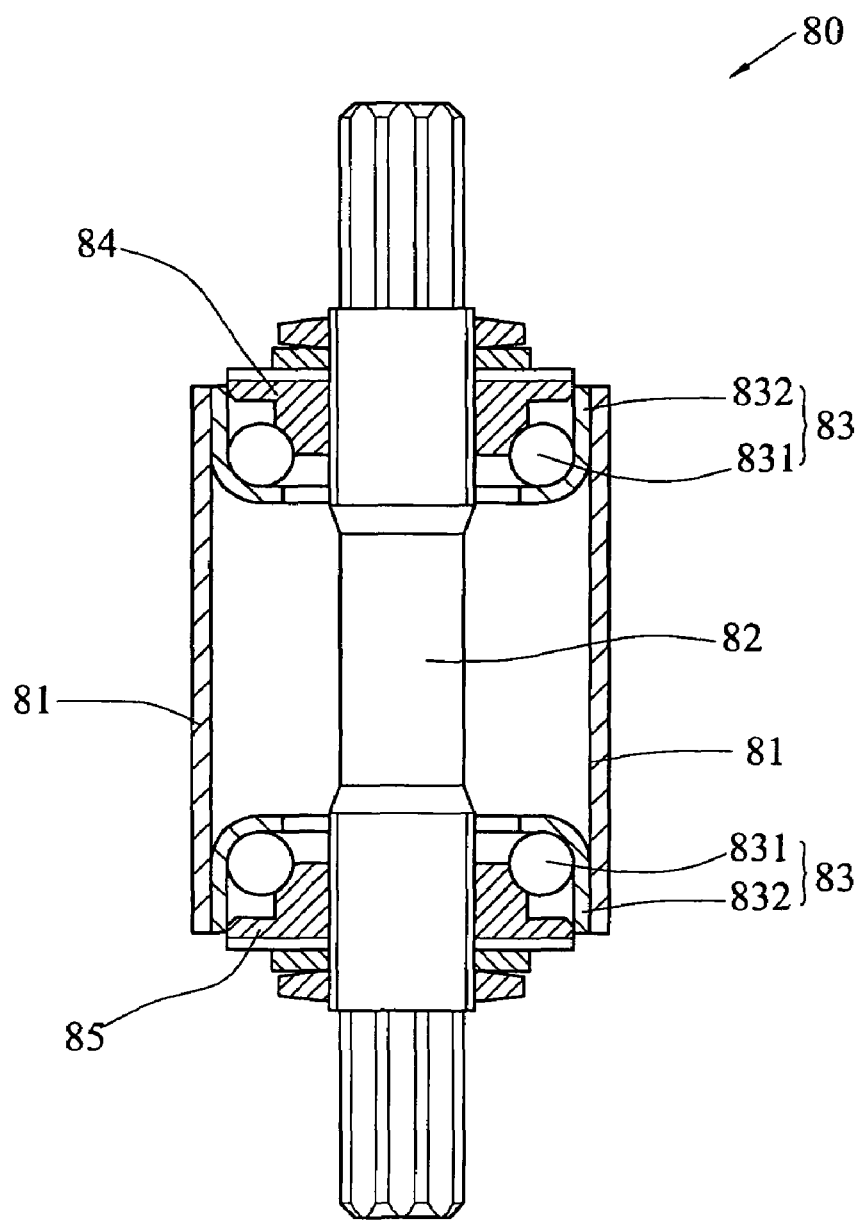
FIG. 11 is a cross sectional view to show the conventional bottom bracket assembly in FIG. 10.

FIG. 9 shows another embodiment of the bottom bracket assembly of the present invention wherein the bottom bracket 10 includes a tapered inner periphery 100 at each of the two open ends thereof and the threaded section 23 of each base 20 includes a tapered outer periphery 210 which is matched with the tapered inner periphery 100 at each of the two open ends of the bottom bracket 10.

While we have shown and described the embodiment in accordance with the present invention, it should be clear to those skilled in the art that further embodiments may be made without departing from the scope of the present invention.

What is claimed is:

1. A bottom bracket assembly for supporting a crank axle of bicycle, comprising:
    a bottom bracket;
    two bases securely connected to two open ends of the bottom bracket and each base having a recess defined in an end thereof;
    two bearings having a central hole respectively received in the recesses of the two bases;
    two collars each having a neck which is inserted into and engaged with each central hole of the bearing corresponding thereto and each neck having a tapered inner periphery;
    an axle extending through the two bearings and the two collars, and
    two positioning rings mounted to the axle and each located to extend radially between the axle and the tapered inner periphery of the collar, each positioning ring having a tapered outer periphery which is matched with the tapered inner periphery of the collar corresponding thereto, the two positioning rings each having a longitudinal cut-off so that the two positioning rings each are a C-shaped ring.

2. The assembly as claimed in claim 1, wherein each of the two bases has a flange extending radially therefrom and an outer diameter of the flange is the same as an outer diameter of the bottom bracket.

3. The assembly as claimed in claim 2, wherein the flanges extend beyond the two ends of the bottom bracket.

4. The assembly as claimed in claim 2, wherein the recess is defined in a center of the flange.

5. The assembly as claimed in claim 1, wherein the axle is snugly engaged with an inner periphery of each of the positioning rings.

6. The assembly as claimed in claim 1, wherein the two positioning rings each are made by plastic.

7. The assembly as claimed in claim 1, wherein the two positioning rings each are made by plastic.

8. The assembly as claimed in claim 1, wherein the central hole of each bearing has a tapered inner periphery and the neck of each collar has a tapered outer periphery which is engaged with the tapered inner periphery of the bearing.

9. A bottom bracket assembly for supporting a crank axle of bicycle, comprising:
    a bottom bracket;
    two bases securely connected to two open ends of the bottom bracket and each base having a recess defined in an end thereof;
    two bearings having a central hole respectively received in the recesses of the two bases;
    two collars each having a neck which is inserted into and engaged with each central hole of the bearing corresponding thereto and each neck having a tapered inner periphery;
    an axle extending through the two bearings and the two collars, and
    two positioning rings mounted to the axle and each located between the axle and the tapered inner periphery of the collar, each positioning ring having a tapered outer periphery which is matched with the tapered inner periphery of the collar corresponding thereto;
    wherein each of the two open ends of the bottom bracket has a threaded inner periphery and each base has a threaded insertion which is threadedly connected with the threaded inner periphery of the bottom bracket.

10. A bottom bracket assembly for supporting crank axle of bicycle, comprising:
    a bottom bracket;
    two bases securely connected to two open ends of the bottom bracket and each base having a recess defined in an end thereof;
    two bearings having a central hole respectively received in the recesses of the two bases;
    two collars each having a neck which is inserted into and engaged with each central hole of the bearing corresponding thereto and each neck having a tapered inner periphery;
    an axle extending through the two bearings and the two collars, and
    two positioning rings mounted to the axle and each located to extend radially between the axle and the tapered inner periphery of the collar, each positioning ring having a tapered outer periphery which is matched with the tapered inner periphery of the collar corresponding thereto, the two positioning rings each having a small end and a wide end, a plurality of notches being defined longitudinally in the small end.

\* \* \* \* \*